United States Patent [19]

Kupper et al.

[11] 3,804,530

[45] Apr. 16, 1974

[54] OPTICAL INTERPOLATION DEVICE INCLUDING A COUNTER

[75] Inventors: Walter Kupper; Bruno Rüfenacht, both of Griefensee, Switzerland

[73] Assignee: Mettler Instrumente AG, Zurich, Switzerland

[22] Filed: Aug. 31, 1972

[21] Appl. No.: 285,252

[30] Foreign Application Priority Data

Sept. 24, 1971 Switzerland ........................ 13951/71

[52] U.S. Cl. ................ 356/170, 33/125 A, 350/113, 353/41, 356/222

[51] Int. Cl. .. G03b 21/10, G02b 17/06, G01d 5/04, G01d 13/04

[58] Field of Search ........... 350/110, 114, 115, 116; 356/170, 169; 33/125 A

[56] References Cited

UNITED STATES PATENTS

| | | | |
|---|---|---|---|
| 3,502,415 | 3/1970 | Hock | 356/170 |
| 3,238,838 | 2/1966 | Gottesmann | 356/170 |
| 2,301,935 | 11/1942 | Ehringhaus | 356/170 |

FOREIGN PATENTS OR APPLICATIONS

| | | | |
|---|---|---|---|
| 168,463 | 4/1965 | U.S.S.R. | 356/170 |
| 139,083 | 4/1960 | U.S.S.R. | 356/110 |
| 1,133,902 | 7/1962 | Germany | 356/110 |

*Primary Examiner*—Ronald L. Wibert
*Assistant Examiner*—Steve K. Morrison

[57] ABSTRACT

An optical interpolation apparatus including means for interpolating the value of the reading on a scale between a pair of adjacent spaced scale indicia, said optical interpolation apparatus including counter means affording a counting range corresponding with the space between a pair of adjacent scale indicia, and an optical element displaceable between first and second end positions of travel relative to the interpolation apparatus housing in accordance with the instantaneous count of said counter means. The invention is characterized by the provision of means for returning the optical element to its first position each time the counter means exceeds the limits of its counting range. In the preferred embodiment, cam disk and cam follower elements are driven by the counter means to pivot the optical element between its first and second positions, the cam surface of said cam disk containing a ramp return portion for returning the optical element to its first position when the instantaneous count of said counter means is at one of its end limits.

5 Claims, 3 Drawing Figures

OPTICAL INTERPOLATION DEVICE INCLUDING A COUNTER

This invention relates to optical interpolation means for interpolating the value of the reading on a scale between a pair of adjacent spaced scale indicia, use being made of counter means affording a counting range corresponding with the space between said pair of scale indicia, and optical read-out means including an optical element connected with said counter means for displacement between first and second end limits of travel in accordance with the instantaneous count contained in said counter means.

Interpolation apparatus of this kind have utility in situations where, after a value to be measured has been approximately determined, a fine adjustment is to be effected for determining the last decimal places of the value to be measured, as occurs, for example, in measuring microscopes, inclination balances with optical indication, and the like.

Such interpolation means have been proposed, for example, in German Pat. No. 1,046,894 and German Auslegeschrift No. 1, 202,013, but these devices are adjustable only within the range of fine measurement, and consequently further rotation beyond the limits of that range is not possible. Generally this limitation is of no importance, but in certain applications of such apparatus it is desirable to be able to continue the interpolation actuation in the same direction as, for example, in the case of fine adjustments which go beyond a coarse interval (measurement mark spacing), or, in the case of balances, fine weighing-in operations. The same also applies to those situations in which the value to be measured lies in the vicinity of a measuring mark, and a slight settling oscillation occurs during operation of the interpolation apparatus. The process of turning back to the starting point, which is necessary in the known arrangements, (the value to be measured being, for example, 0.02 instead of 0.98) is found to be troublesome, particularly in the case of 100-part micrometers, and in addition, this results in time being wasted.

It is also known that various types of interpolation apparatus can be automated by incorporating a motor which is driven by sensing control means that generally include photoelectric cells as evidenced, for example, by the British Pat. No. 983,961. However, transferring the provision of a motor to interpolation means (as proposed, for example, in the two German specifications mentioned above) gives rise to difficulties, particularly due to the necessity for re-setting to zero before passing through a fresh measuring range.

A primary object of the present invention is to provide an improved optical interpolation apparatus including means for interpolating the value of the reading on a scale between a pair of adjacent spaced scale indicia, said apparatus including counter means affording a counting range corresponding with the space between said pair of scale indicia, and optical read-out means including a pivotable optical element operable between first and second end limit positions by the counter means in accordance with the count contained therein, characterized by the provision of return means for returning said optical element to its first end limit position whenever the limits of the range of said counter means are exceeded.

A more specific object of the present invention is to provide optical interpolation apparatus of the type described above, wherein the counter means is connected with said optical element by cam disk and follower means, the return means consisting of a ramp portion on the cam periphery of the cam disk for moving said optical element between its end limit positions.

Other objects and advantages of the invention will become apparent from a study of the following specification when viewed in the light of the accompanying drawing, in which.

Figure 1:
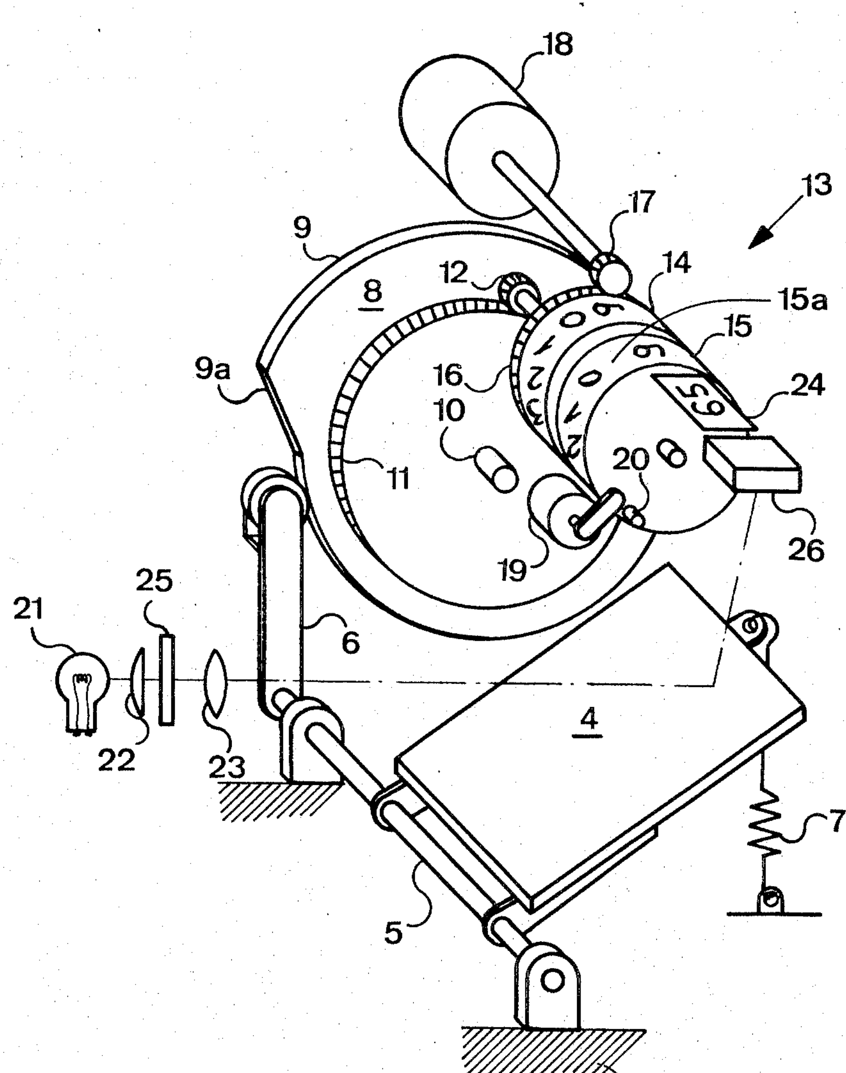
FIG. 1 is a detailed perspective view of the preferred form of optical micrometer apparatus according to the present invention.

The embodiment selected to illustrate the invention is an inclination balance with optical weight indication, in which an illuminating optical system forms, on a ground-glass plate disposed in the balance housing, the image of a portion of a measuring plate which is secured to the balance beam and which is provided with digits and indicating marks. The last decimal places of the particular weight being measured are then obtained so that they can also be read off digitally, by means of the micrometer. Only the components which are necessary for comprehension of the mode of operation of the micrometer are shown in the drawings.

Referring first more particularly to FIG. 1, the optical interpolation apparatus, which operates automatically, has a displaceable optical element in the form of a pivotal mirror 4. The mirror 4 is rigidly connected with a shaft 5 which is rotatably supported by the base of the balance housing (H) and which is provided at its other end with a roller lever or cam follower 6. The mirror 4 is engaged by a traction spring 7 so that the roller of the lever 6 is constantly biased into engagement with the periphery 9 of the cam disk 8. The cam disk 8, which is rotatably mounted on a shaft 10 fixed in the housing, is in the form of an Archimedean spiral over ten elevenths of its periphery, and therefore has continuously varying radii. The eleventh eleventh of the periphery of the cam disk 8 is formed by a ramp face **9*a*** which interconnects the points of smallest and largest radius of the cam disk.

Fixedly connected with the cam disk 8 is a gear wheel 11 which engages with a pinion 12, which is reduced in the ratio 1:11. The pinion 12 is fixedly connected to a units counting cylinder 14 of a counting mechanism 13, and to a further gear wheel 16 which engages with a pinion 17 on the shaft of a motor 18. Connected to the units cylinder 14 by a 1:10 stepping mechanism (not shown) is a tens cylinder 15.

Supported by the balance housing is a duplex microswitch 19 which is arranged for actuation by a projection 20 on the tens cylinder 15 (which has a blank portion **15*a*** between digits 0 and 9).

A light source 21 projects a ray of light onto the mirror 4 via a condenser lens 22, the transparent measuring plate 25 which is secured to the balance beam and which bears digits and indicating marks, and an objective lens 23. The light ray is deflected by mirror 4 onto a ground-glass plate 24 which is only diagrammatically indicated in FIG. 1 and on which is produced an image of the particular portion of the measuring plate 25 through which the light beam passes. The ray of light also impinges on photoelectric sensing means 26.

Figure 2:
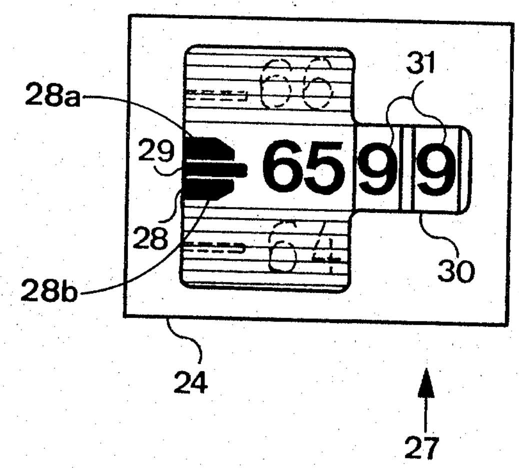
FIG. 2 is a detailed view of the read-off image of the weight value.

Referring now to FIG. 2, a part of the read-off window is formed by the ground-glass plate 24 upon which are read off the first weight decimals projected by the measuring plate 25 (for example, 65g.). The upper and the lower parts (in FIG. 2) of the plate 24 are of a different color from the central part in which the digits 65 appear, so that the figures and marks adjacent the weight value to be read off can in fact be observed, but considerably less clearly than in the read-off area of the plate 24.

Disposed beside the digits are fork means 28 that define a pair of spaced stationary marks 28*a*, 28*b* for embracing the movable mark 29 corresponding to the first digits, while in an adjacent aperture 30 appear digits 31 of the micrometer, being in the case illustrated 0.99, the reading therefore being 65.99g.

The visual representation of the mark 29 embraced by the fork means 28, in the region of the plate 24, only applies, strictly speaking, for the case of a manually operated micrometer. It is only given here to clarify the principle of "embracing" by the fork means 28.

Figure 3:
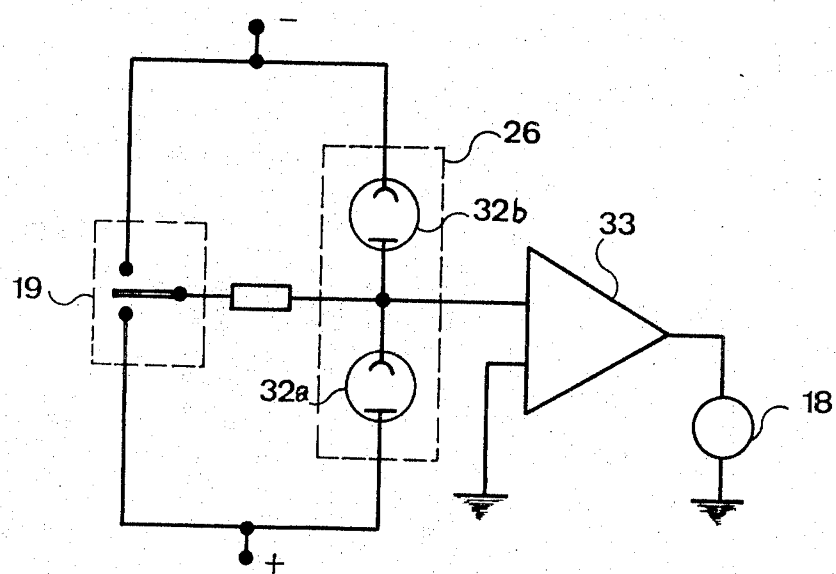
FIG. 3 is an electrical schematic diagram illustrating the photocell control circuit of the micrometer.

FIG. 3 shows the photoelectric control circuit of the micrometer. The sensing means 26 includes two photoelectric cells 32*a* and 32*b* corresponding to the stationary marks 28*a* and 28*b*, respectively, for producing a difference signal which is amplified by an amplifier 33 and drives the motor 18 which acts by way of the transmission comprising members 17, 16, 12 and 11 to move the cam disk 8 and thus the mirror 4 until, when a locating mark such as 29 is embraced by the photoelectric cells 32*a* and 32*b*, respectively, no difference signal is produced, and the motor comes to a standstill. In the case where motor 18 comprises a reversible motor, the polarity of the difference signal produced by the photocell means controls, in a known manner, the direction of rotation of said motor.

Shortly before the ramp face 9*a* reaches the roller lever 6 from either direction by rotation of the cam disk 8 (the digit condition of the counting mechanism 13 then being 00 or 99), the switch 19 is actuated by the projection 20. This causes the photoelectric control circuit to be rendered inoperable (for example, by short circuiting the corresponding photoelectric cell) to prevent the control signal of the sensing means from allowing the motor to come to a standstill when making the transition from 9 to 0 (or 99 to 00) or vice-versa, whereby the motor 18 continues to run at full speed in the same direction as previously, until after the roller lever 6 leaves the ramp face 9a (corresponding to the counting mechanism 13 being in a condition of 99 or 00, respectively) the switch 19 is released again by the projection 20 and returns to its middle position, and thus the control operation begins again.

The construction in the form of an automatic interpolation apparatus affords the further advantage of an additional saving of time. Already while the balance is swinging into the equilibrium position, the control circuit begins to work, and after the swinging-in process is concluded, the result, including the last decimals, is ready for reading-off virtually at the same time. When the weighing operation is completed and the load is again removed from the balance, the interpolation apparatus is automatically set to the zero point mark. This means that a change in the zero point can be immediately read off digitally at the interpolation apparatus, and thus there is available a reference to any necessary correction of the zero point, and the extent of such correction.

Thus, with the above-described construction, it is possible to omit the limit abutments which in conventional interpolation apparatus prevent adjustment beyond the limits of the fine measuring range, and it is now possible for the fine measuring range to be passed through in any direction as often as desired.

While in accordance with the Patent Statutes the preferred form and embodiment of the invention has been illustrated and described, various modifications may be made in the apparatus described without deviating from the inventive concepts set forth above.

What is claimed is:

1. Apparatus for interpolating the actual value of a reading between a pair of a plurality of equally spaced indicia on a transparent scale (25) that is arranged for movement relative to a housing (H), said apparatus including a light source (21) for directing a light beam onto said scale to define a scale reading, a stationary display plate (24) connected with said housing, and mirror means (4) for reflecting onto said display plate the image of said scale reading; the improvement wherein a. said mirror means includes a mirror (4), and means (5) pivotally connecting said mirror with said housing;

b. and further including operating means for pivoting said mirror between first and second positions relative to said housing, said operating means including
   1. a cam disk (8) rotatably connected with said housing, said cam disk having on its outer periphery an Archimedean spiral portion and a ramp portion (9*a*) connected between the ends of the spiral portion; and
   2. cam follower means (6) operable by the spiral portion of said cam disk for gradually pivoting said mirror from said first position toward said second position, said cam follower means also being operable by said ramp portion to rapidly pivot said mirror from said second position toward said first position;

c. rotatably driven reversible counter means (13) including at least one rotary indicia cylinder arranged adjacent said display plate for interpolating the image of said scale reading, said counter means having an input shaft; and d. pinion gear means (11, 12) connected between said cam disk and said input shaft for rotatably driving said counter means throughout its counting range simultaneously with pivotal movement of said mirror between said first and second positions, whereby when said mirror is pivoted to displace the reflected image (29) to a given position (28) on the display plate, a count is introduced into the counter means that is a function of the interpolated distance of the actual scale reading relative to the distance between a corresponding pair of scale indicia.

2. Apparatus as defined in claim 1, wherein said spiral portion extends over ten-elevenths of the periphery of the cam disk and said ramp portion extends over the remaining one-eleventh of the cam disk periphery, and further wherein said pinion and gear means have a one-to-eleven gear ratio.

3. Apparatus as defined in claim 1, and further including e. electric motor means (18) connected with said pinion means; and f. photocell means (26) connected with said housing in the path of the reflected scale image adjacent said display plate for operating said motor means to pivotally adjust said mirror to displace said scale image to said given position on the display plate.

4. Apparatus as defined in claim 3, wherein said motor means is reversible, and further wherein said photocell means includes a pair of spaced photocells (**32*a*, 32*b***) arranged on opposite sides of said given position, respectively.

5. Apparatus as defined in claim 3, and further including switch means (19) for deactivating said photocell means when at least one limit of the counter range is reached.

* * * * *